(12) United States Patent
Fukutomi

(10) Patent No.: US 6,688,671 B2
(45) Date of Patent: Feb. 10, 2004

(54) IMPACT ABSORPTION DEVICE

(75) Inventor: Takeshi Fukutomi, Aichi (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 10/166,022

(22) Filed: Jun. 10, 2002

(65) Prior Publication Data
US 2002/0195833 A1 Dec. 26, 2002

(30) Foreign Application Priority Data
Jun. 11, 2001 (JP) ........................................ 2001-175171

(51) Int. Cl.[7] .................................................. B60J 5/00
(52) U.S. Cl. ................................ 296/146.6; 296/187.12
(58) Field of Search .............................. 296/189, 146.1, 296/146.2, 146.5, 146.6, 146.7, 187.12; 49/502; 52/731.6

(56) References Cited

U.S. PATENT DOCUMENTS

| | | | | |
|---|---|---|---|---|
| 5,580,119 A | * | 12/1996 | Uchida et al. ............ | 296/146.6 |
| 5,636,866 A | * | 6/1997 | Suzuki et al. ............ | 296/146.7 |
| 5,716,093 A | * | 2/1998 | Sadr ........................ | 296/146.6 |
| 5,749,600 A | * | 5/1998 | Yamada et al. ............. | 296/189 |
| 5,806,889 A | * | 9/1998 | Suzuki et al. ............... | 296/189 |
| 5,865,496 A | * | 2/1999 | Odan et al. ............... | 296/146.6 |
| 6,203,096 B1 | * | 3/2001 | Noda et al. ............... | 296/146.6 |
| 6,474,721 B2 | * | 11/2002 | Nishikawa et al. ....... | 296/146.6 |

* cited by examiner

Primary Examiner—Dennis H. Pedder
Assistant Examiner—Jason Morrow
(74) Attorney, Agent, or Firm—Rossi & Associates

(57) ABSTRACT

There is provided an impact absorption device that comprises an impact bar 24 extending in the longitudinal direction of a vehicle door 20 and a hollow impact absorption member 30 with an upper end rib 32 locked on the impact bar 24 and a lower end rib 34 locked on an internal wall of a door inner panel 22 via a long bracket 35. A fragile portion 36 is formed in the upper end rib 32, and an end 41 of the impact absorption member 40 provided on a door trim 23 is positioned opposite to the impact absorption member 30 with a gap 42 formed there between.

16 Claims, 6 Drawing Sheets

IMPACT ABSORPTION DEVICE

This non-provisional application claims priority under 35 U.S.C. 119(a) on Patent Application No. 2001-175171 filed in Japan on Jun. 11, 2001, which is herein incorporated by reference.

BACKGROUND OF THE INVENTION

1. Field of the Invention

This invention relates to an impact absorption device that absorbs impact when a vehicle is crushed from the outside.

2. Description of the Related Art

There are conventional impact absorption devices as proposed in Japanese Laid-open Utility Patent Publication (Kokai) No. 4-54722, Japanese Laid-open Patent Publication (Kokai) No. 2000-127763, etc. As shown in FIG. 5, an impact bar 1 is disposed in a vehicle door 2 in such a manner to extend in the longitude direction of a vehicle, and the upper end of an impact absorption member 3 is connected to the impact bar 1, while the lower portion thereof is connected to an inner wall surface of the vehicle door 2 by a bracket 4. Further, the impact absorption member 3 is arranged inside and in proximity to a door outer panel 5. On the other hand, a pad 8 is fixed to a door trim 7 connecting to a door inner panel 6, and the pad 8 extends toward the door outer panel 5 through a hole 9 formed in the door inner panel 6. Between the impact absorption member 3 and the pad 8, a gap is formed which allows a door glass, not shown, is allowed to be raised and lowered.

As shown in FIG. 6, if impact toward a vehicle compartment is applied to the impact absorption member 3 via the door outer panel 5 when the vehicle including the above-described impact absorption device is crushed by another vehicle 10 or the like from the outside at a position below the impact bar 1, the lower end of the impact absorption member 3 is likely to be deformed toward the vehicle compartment with deformation of the bracket 4 since the bracket 4 is relatively long in the vertical direction. However, the upper end of the impact absorption member 3 connected to the impact bar 1 is restricted in deformation toward the vehicle compartment due to a high strength of the impact bar 1. Therefore, the impact absorption member 3 is unlikely to be deformed toward the vehicle compartment while maintaining the original portion, and therefore collides with the end of the pad 8 in an inclining position. It is therefore difficult to deform the impact absorption member 3 as desired and efficiently absorb impact energy.

Further, as shown in FIG. 7, it may be considered that the upper end of the impact absorption member 3 is connected to the impact bar via a bracket 11 that is relatively long in the vertical direction, so that that the upper end of the impact absorption member 3 can be easily deformed toward the vehicle compartment. If impact toward the vehicle compartment is applied to the impact absorption member 3 via the door outer panel 5 due to collision of another vehicle or the like from the outside, the impact absorption member 3 is deformed inward in the vehicle door 2 while maintaining the original position to cause the impact absorption member 3 to collide with the end of the pad 8. In this case, however, the impact bar 1 serving as a reinforcing member cannot always be disposed at the optimum position.

SUMMARY OF THE INVENTION

It is therefore an object of the present invention to provide an impact absorption device that is capable of absorbing impact energy surely and efficiently by an impact absorption member, which is connected to an impact bar in a vehicle door, when a vehicle is crushed from the outside.

To attain the above object, there is provided an impact absorption device an impact absorption device comprising: an impact bar disposed in a vehicle door and extending substantially in a longitudinal direction of a vehicle; and an impact absorption member with an upper end locked on the impact bar and a lower end locked on an internal wall surface of the vehicle door; and wherein the impact absorption member is easily released from at least one of the impact bar and the internal wall surface of the vehicle door due to impact applied to the impact absorption member from outside via the vehicle door.

With this arrangement, if impact applied to the vehicle door from the outside deforms the vehicle door toward the vehicle compartment, the impact absorption member is easily released from at least one of the impact bar and the inner wall of the vehicle door. Therefore, the impact absorption device is capable of efficiently absorbing impact due to the deformation of the impact absorption member kept in the original position without being affected by the internal construction of the vehicle door, thus surely protecting passengers.

BRIEF DESCRIPTION OF DRAWINGS

The nature of the invention, as well as other objects and advantage thereof, will be explained in the following with reference to the accompanying drawings, in which like reference characters designate the same or similar parts throughout the figures and wherein.

DETAILED DESCRIPTION OF EMBODIMENT

Figure 1:
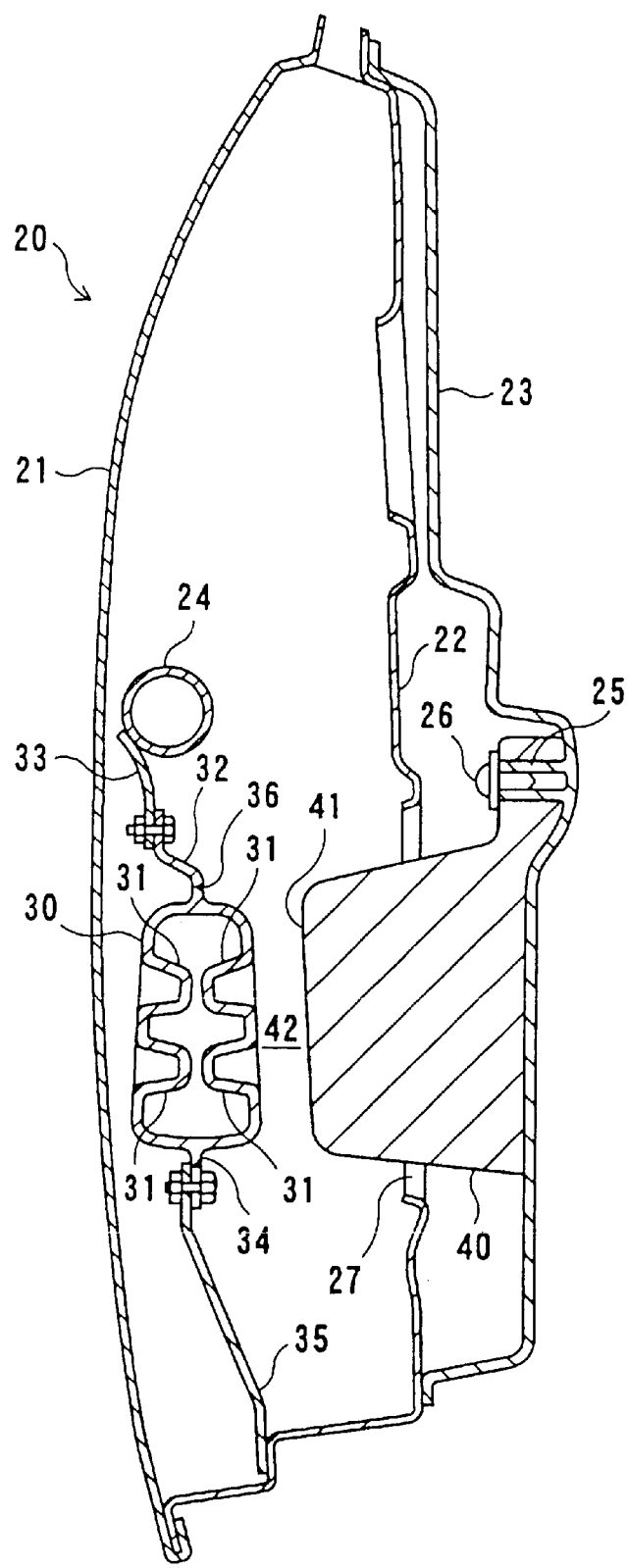
FIG. 1 is a longitudinal sectional view showing an impact absorption device according to an embodiment of the present invention.

An embodiment of the present invention will now be described with reference to the accompanying drawings. In the following description, corresponding elements and parts will be denoted by the same reference numerals.

Figure 2:
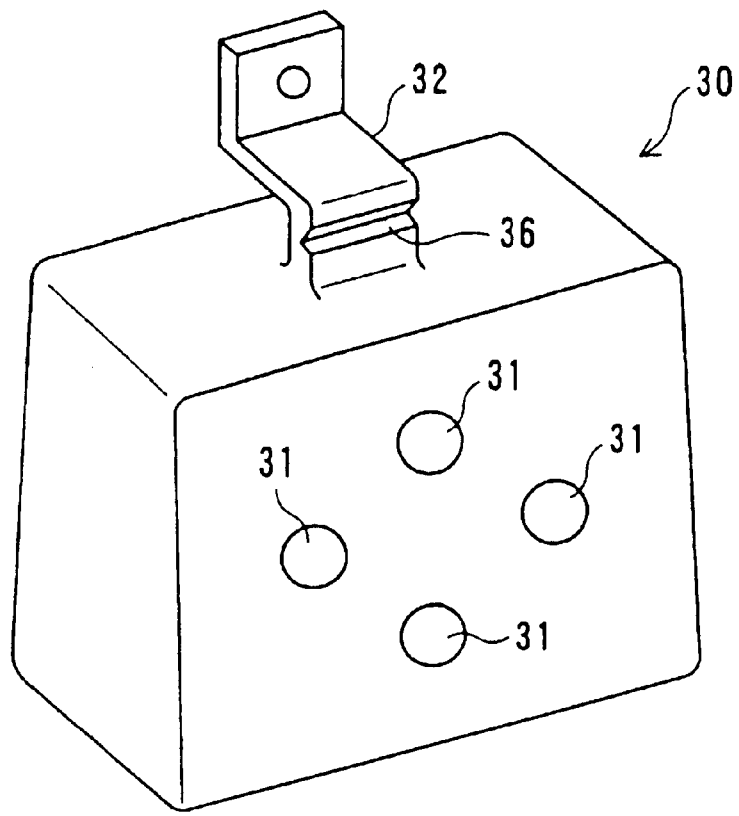
FIG. 2 is an enlarged perspective view showing a principal part of the impact absorption device according to the embodiment.

As shown in FIGS. 1 and 2, a vehicle door 20 is constructed such that a door outer panel 21 and a door inner panel 22 are connected to each other in the direction of the vehicle width, and a door trim 23 is mounted at the vehicle compartment inner side of the door inner panel 22. A circular pipe-shaped impact bar 24 extending in the longitudinal direction of a vehicle is disposed in the vehicle door 20.

A resin impact absorption member 30 that is blow-molded to have a hollow structure is constructed such that a plurality of internal inward projections 31 are formed on opposing walls in the direction of the vehicle width, and the projections 31 extend toward each other and are separated by a small gap there between. An upper end rib 32 is connected to the impact bar 24 via an upper bracket 33 that is relatively short in the vertical direction, and a lower end rib 34 is connected to a stepped inner wall surface of the door inner panel 22 via a lower bracket 35 that is relatively long in the vertical direction. The impact absorption member 30 is disposed at the vehicle compartment inner side of the door outer panel 21 and in proximity to the same. A thin fragile portion 36 is formed in the middle of the upper end rib 32.

Further, a second impact absorption member 40 formed of a forming agent and the like is secured to the vehicle compartment outside of the door trim 23 by a substantially cylindrical projection 25 integrated with the door trim 23 and a clip 26 inserted in the projection 25. An end 41 of the impact absorption member 40 extends toward the door outer panel 21 through a hole 27 formed in the door inner panel 22. A gap 42, which allows a door glass, not shown, to be raised and lowered, is formed between the impact absorption member 30 and the end 41 of the impact absorption member 40.

Figure 3:
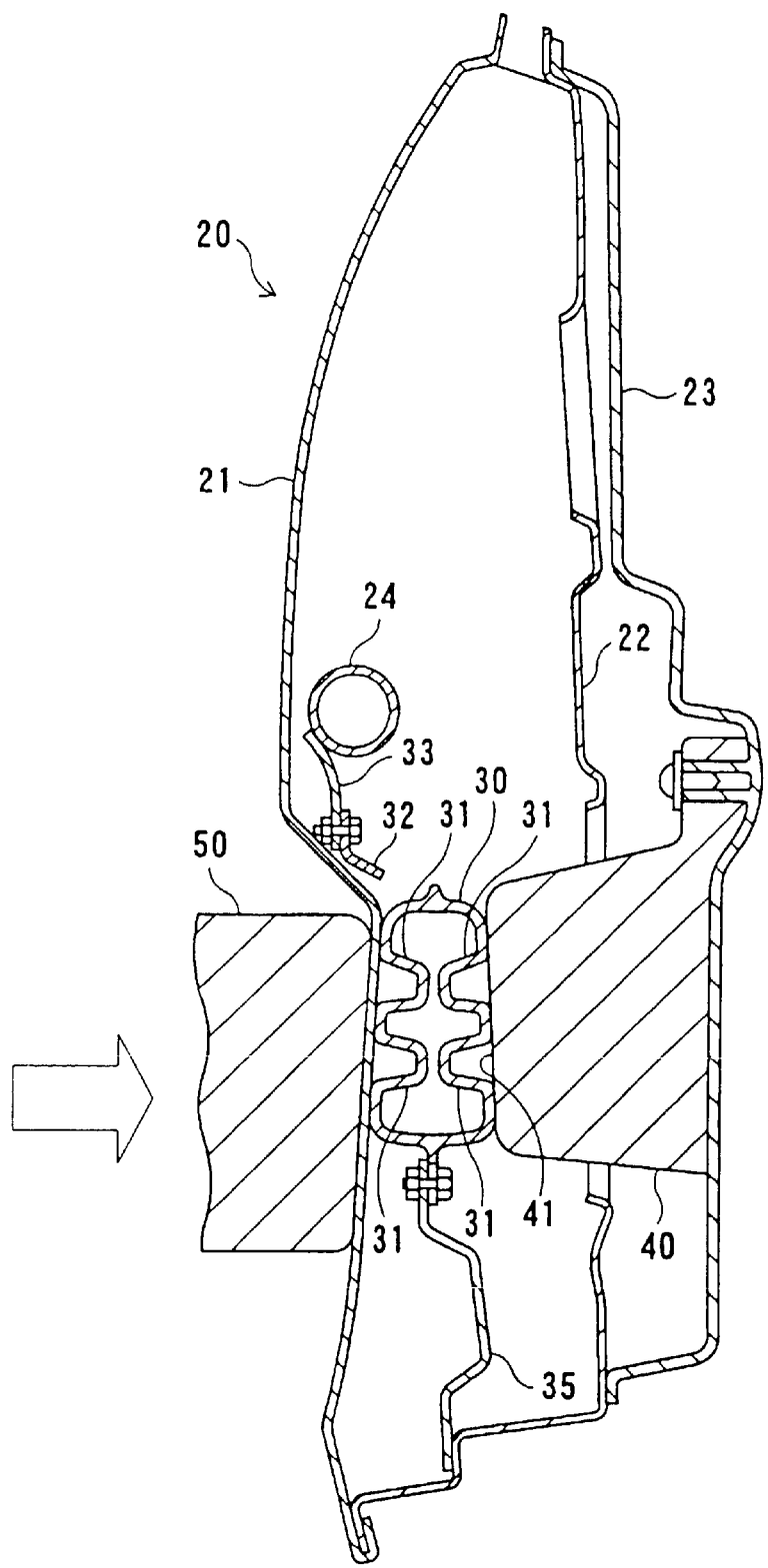
FIG. 3 is a view useful in explaining the operation of the impact absorption device according to the embodiment.

If the vehicle including the above-described impact absorption device is crushed by another vehicle 50 or the like from the outside at a position below the impact bar 24 as indicated by an arrow in FIG. 3, the impact absorption member 30 is pressed toward the vehicle compartment via the door outer panel 21 that is easily deformed toward the vehicle compartment, even if the upper end rib 32 of the impact absorption member 30 is connected to the impact bar 24 serving as a reinforcing member having a high strength via the bracket 33 that is relatively short in the vertical direction. This causes the fragile portion 36 formed in the upper end rib 32 to be broken relatively easily, and thus causes the upper end of the impact absorption member 30 to be separated from the impact bar 24. On the other hand, since the lower end rib 34 of the impact absorption member 30 is connected to the inner wall surface of the door inner panel 22 via the bracket 35 that is relatively long in the vertical direction, and the lower end of the impact absorption member 30 is likely to be deformed toward the vehicle compartment with deformation of the bracket 35, the impact absorption member 30 can easily be displaced toward the vehicle compartment while maintaining the original position without inclining as is the case with the prior art impact absorption device.

Therefore, if the impact absorption member 30 collides with the end 41 of the impact absorption member 40 that is located opposite to the impact absorption member 30 with the gap 42 there between, the bearing power of the impact absorption member 40 compresses and deforms the impact absorption member 30 itself in the direction of the vehicle width. The inward projections 31 on the opposing walls of the impact absorption member 30, which extend toward each other with a small gap there between, are brought into contact with each other, and further, the respective projections 31 and the entire impact absorption member 30 are deformed and crushed to efficiently absorb impact energy. Further, the deformation of the impact absorption member 40 also enables absorption of impact energy.

Specifically, upon side impact of the vehicle, the impact absorption member 30 collides with the end 41 of the impact absorption member 40 while maintaining the substantially original position, and this enables efficient absorption of impact energy. This surely protects passengers, and easily sets the impact energy absorption characteristics of the impact absorption member 30.

Further, upon side impact of the vehicle, the impact absorption member 30 is able to collide with the end 41 of the impact absorption member 40 while maintaining the substantially original position without being restricted by the location of the impact bar 24 on which the upper end of the impact absorption member 30 is locked. This increases the degree of freedom in arranging the impact bar 24, and enables the impact bar 24 serving as the reinforcing member to be arranged at the optimum position.

Further, the raising and lowering of the door glass is never obstructed by the gap 42 that is formed between the impact absorption member 30 and the impact absorption member end 41. The impact absorption member 30 and the impact absorption member 40 can be arranged in a narrow space, and the interaction of the impact absorption member 30 and the impact absorption member 40 efficiently absorbs impact resulting from the side collision.

Although in the above-described embodiment, a plurality of inward projections 31 are provided on the opposing walls of the impact absorption member 30, there is no intention to limit the invention to this. For example, the opposing walls may be connected to each other by pillars in place of the projections 31 in the direction of the vehicle width, or a solid impact absorption member formed of a porous material may be used in place of the impact absorption member 30 so as to achieve the same effects as the above-described embodiment.

Further, although in the above-described embodiment, the fragile portion is formed in the upper end of the impact absorption member that is locked on the impact bar, there is no intention to limit the invention to this. For example, in the case where the upper end of the impact absorption member locked on the impact bar is allowed to be easily deformed toward the vehicle compartment whereas the lower end of the impact absorption member locked on the internal wall surface of the vehicle door is restricted in deformation toward the vehicle compartment, the fragile portion may be formed in the lower end. In another alternative form, fragile portions may be provided in both the upper end of the impact absorption member locked on the impact bar and the lower end of the impact absorption members locked on the inner surface wall of the vehicle door. In this case, both fragile portions are broken upon side impact of the vehicle, and this causes the impact absorption member to rapidly collide with the second absorption member or the like provided at the vehicle door inside of the door trim immediately (before the impact absorption member falls).

Figure 4:
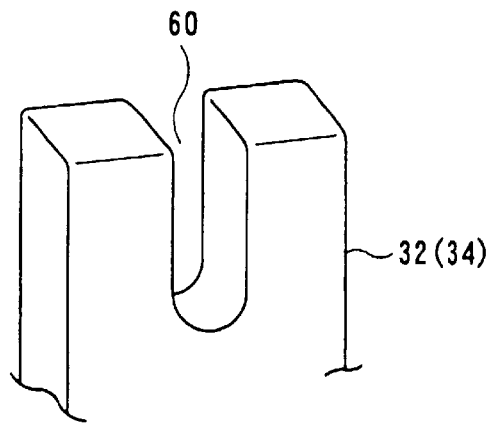
FIG. 4 is a partial enlarged perspective view showing an impact absorption device according to another embodiment of the present invention.
Figure 5:
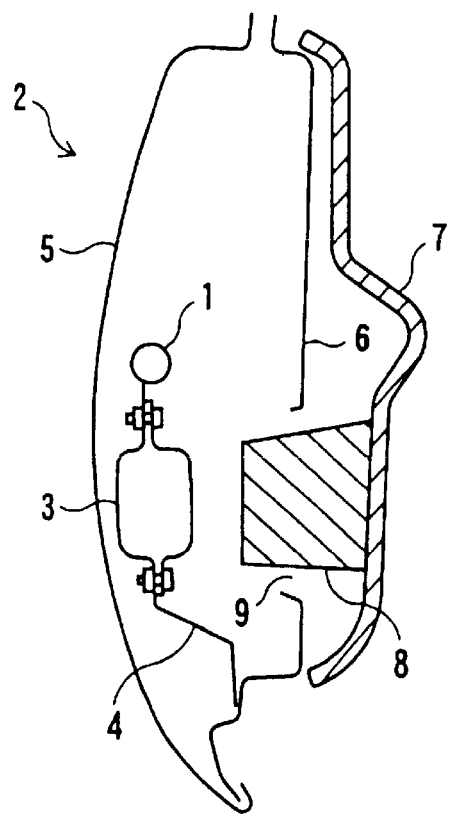
FIG. 5 is a schematic longitudinal sectional view showing an impact absorption device according to a prior art.
Figure 6:
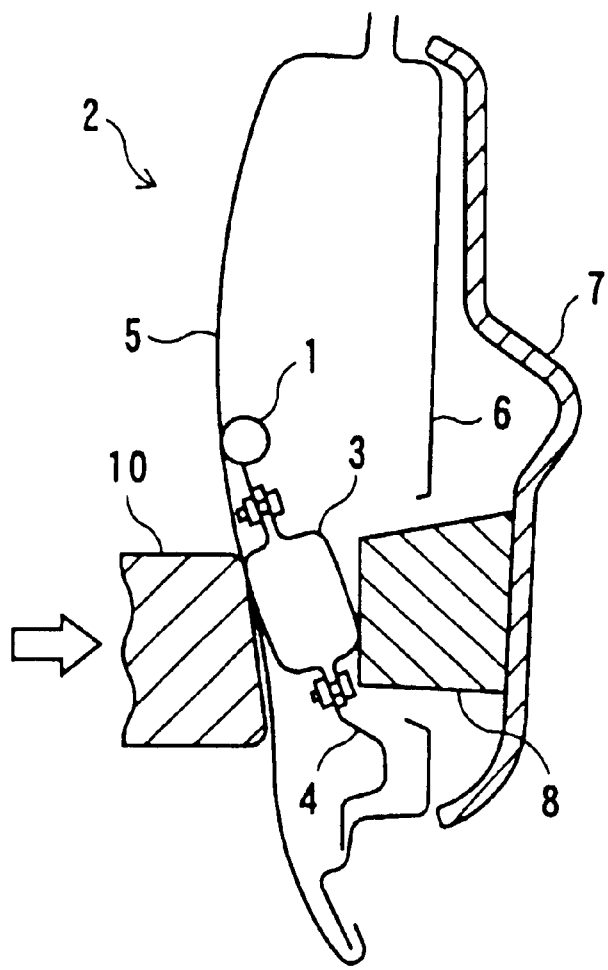
FIG. 6 is a view useful in explaining the operation of the impact absorption device according to the prior art.
Figure 7:
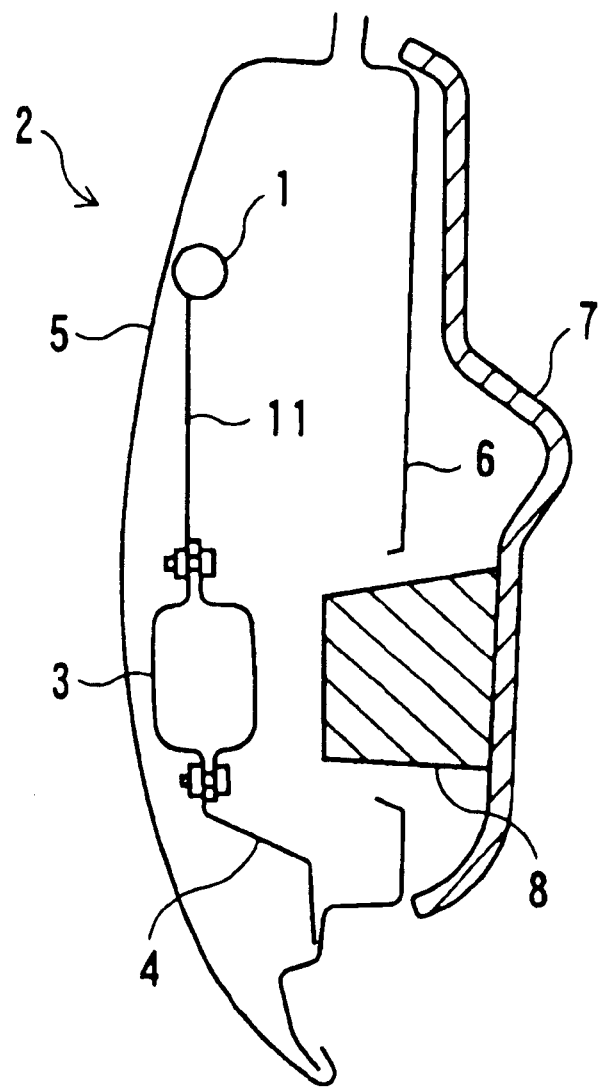
FIG. 7 is a schematic longitudinal sectional view showing an impact absorption device according to another prior art.

Further, although in the above-described embodiment, the fragile portion of the impact absorption member is broken upon side impact of the vehicle, there is no intention to limit the invention to this. For example, as shown in FIG. 4, a slit 60 extending vertically may be formed in the upper end rib 32 and/or the lower end rib 34 of the impact absorption member, and the upper end rib 32 and/or the lower end rib 34 are locked on the impact bar and the internal wall of the vehicle door, respectively by a screw, not shown, inserted into the slit 60. When the impact absorption member is strongly pressed toward the vehicle compartment upon side impact of the vehicle, the upper end rib 32 and/or the lower end rib 34 are curved to pull the impact absorption member toward the vehicle compartment. This causes the screw or the like to fall out from the slit 60 to release the upper end rib 32 and/or the lower end rib 34 from the impact bar 24 and the internal wall of the vehicle door, respectively.

What is claimed is:

1. An impact absorption device comprising:
    an impact bar disposed in a vehicle door and extending substantially in a longitudinal direction of a vehicle; and an impact absorption member with an upper end locked on said impact bar by a first bracket and a lower end locked on an internal wall surface of the vehicle door by a second bracket;

wherein said impact absorption member has a fragile portion in at least one of said upper end and said lower end; and wherein said impact absorption member is easily released from at least one of said impact bar and the internal wall surface of the vehicle door due to impact applied to said impact absorption member from outside via the vehicle door.

2. An impact absorption device, comprising:

an impact bar disposed in a vehicle door and extending substantially in the longitudinal direction of a vehicle; and an impact absorption member with an upper end locked on said impact bar and a lower end locked on an internal wall surface of the vehicle door;

wherein a fragile portion is formed in both the locked upper end and the locked lower end; and wherein said impact absorption member is easily released from at least one of said impact bar and the internal wall surface of the vehicle door due to impact applied to said impact absorption member from outside via the vehicle door.

3. An impact absorption device according to claim 1, comprising a door trim provided at a vehicle compartment inner side of the vehicle door, and wherein when said impact absorption member is released from at least one of said impact bar and the internal wall of said vehicle door, said impact absorption member is brought into contact with a vehicle door inner side of said door trim.

4. An impact absorption member according to claim 3, wherein when said impact absorption member is released from at least one of said impact bar and the internal wall surface of the vehicle door, said impact absorption member is brought into contact with a second impact absorption member provided in the vehicle door inner side of said door trim.

5. An impact absorption device according to claim 1, wherein said impact absorption member is formed to have a hollow structure.

6. An impact absorption device according to claim 5, wherein said impact absorption member has at least one projection on an internal wall.

7. An impact absorption device according to claim 5, wherein said impact absorption member is blow-molded.

8. An impact absorption device according to claim 2, wherein said fragile portion includes a vertical slit.

9. An impact absorption device comprising:

an impact bar disposed in a vehicle door and extending substantially in a longitudinal direction of a vehicle; and an impact absorption member with an upper end locked on said impact bar and a lower end locked on an internal wall surface of the vehicle door;

wherein said impact absorption member is easily released from at least one of said impact bar and the internal wall surface of the vehicle door due to impact applied to said impact absorption member from outside the vehicle door; and wherein said impact absorption member is a hollow structure with at least one projection formed on an internal wall that faces toward the vehicle door and at least one projection formed on an internal wall that faces away from the vehicle door, such that the projections are separated by a gap.

10. An impact absorption device comprising:

an impact bar disposed in a vehicle door and extending substantially in a longitudinal direction of a vehicle; and an impact absorption member with an upper end locked on said impact bar and a lower end locked on an internal wall surface of the vehicle door;

wherein said impact absorption member is easily released from at least one of said impact bar and the internal wall surface of the vehicle door due to impact applied to said impact absorption member from outside the vehicle door; and wherein said impact absorption member is a hollow structure in which internal opposing vertical walls are connected by pillars that extend in the direction of the vehicle width.

11. An impact absorption device according to claim 2, comprising a door trim provided at a vehicle compartment inner side of the vehicle door, and wherein when said impact absorption member is released from at least one of said impact bar and the internal wall of said vehicle door, said impact absorption member is brought into contact with a vehicle door inner side of said door trim.

12. An impact absorption member according to claim 11, wherein when said impact absorption member is released from at least one of said impact bar and the internal wall surface of the vehicle door, said impact absorption member is brought into contact with a second impact absorption member provided in the vehicle door inner side of said door trim.

13. An impact absorption device according to claim 2, wherein said impact absorption member is formed to have a hollow structure.

14. An impact absorption device according to claim 13, wherein said impact absorption member has at least one projection on an internal wall.

15. An impact absorption device according to claim 13, wherein said impact absorption member is blow-molded.

16. An impact absorption device according to claim 1, wherein said fragile portion includes a vertical slit.

* * * * *